Sept. 2, 1941.       D. T. BROCK ET AL       2,254,349
BRAKE
Original Filed Aug. 28, 1937

Denis T. Brock
Geoffrey Robert G. Gates
INVENTOR.

BY
M. W. McConkey
ATTORNEY.

Patented Sept. 2, 1941

2,254,349

UNITED STATES PATENT OFFICE 2,254,349

BRAKE

Denis Tabor Brock and Geoffrey Robert Greenbergh Gates, London, England, assignors to Automotive Products Company Limited, London, England Original application August 28, 1937, Serial No. 161,518. Divided and this application September 14, 1939, Serial No. 294,896. In Great Britain August 28, 1936

5 Claims. (Cl. 188—106)

The invention relates to brake applying means for vehicles, and more particularly to brake systems including a service brake usually controlled by a foot pedal and an emergency brake which is usually controlled by a hand lever.

It has been found that as the wear of the brake lining becomes excessive the brake pedal reaches such an extent of movement that it touches the floor-boards before the brakes are fully applied. To overcome this drawback, it has been proposed to provide means tending to apply the hand-brake and means for holding the hand-brake in "off" position, said holding means being adapted to be released as the applying means of the foot-brake reaches a predetermined extent of operating travel.

One object of the present invention is to provide a brake system in which the means tending to apply the hand-brake are interposed in a mechanical connection between the brake rigging and the hand lever or its equivalent by which said hand brake is normally applied.

Another object of the invention is to provide a brake mechanism including means tending to apply the hand brake automatically, said means, when released, causing a shortening of the connection between the hand lever or equivalent and the wheel brake assemblies, thereby applying the hand brake automatically without moving the hand lever which is objectionable, since upon sudden release of the holding means a violent movement of the hand lever may even cause injury to the occupants of the vehicle.

Another object of the invention is to provide a brake including a coiled spring which may conveniently be maintained in a stressed condition by a catch so as to be inoperative during the normal application of the hand-brake by the usual lever or equivalent, and means for releasing said catch to apply the hand-brake automatically in the event the brake pedal reaches a predetermined position in its operating travel.

A further object of the invention is to provide means for automatically applying the hand-brake and including a coiled spring acting at the intermediate pivotal joint of a toggle linkage, the two outer ends of which are connected respectively with the hand lever or equivalent and with the wheel brakes to be actuated by said hand lever or equivalent, the spring conveniently being maintained in a stressed condition by a catch which acts upon the toggle linkage, adjacent its intermediate pivotal point, and which is released to bring about the automatic application of the hand-brake.

Other objects and advantages of the invention will be apparent from the following specification referring to the accompanying drawing in which.

Figure 1:
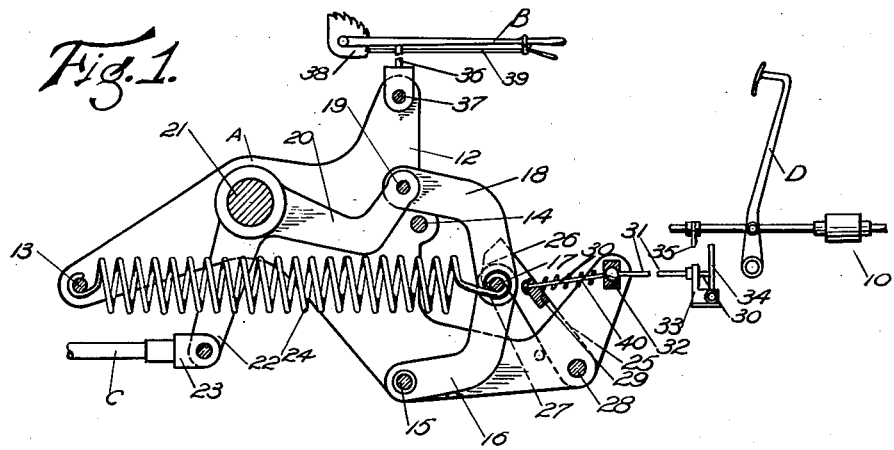
Figure 1 shows in sectional side elevation one form of hand-brake applying mechanism utilizing a toggle linkage, the section being taken on the line 1—1 of Figure 2.
Figure 2:
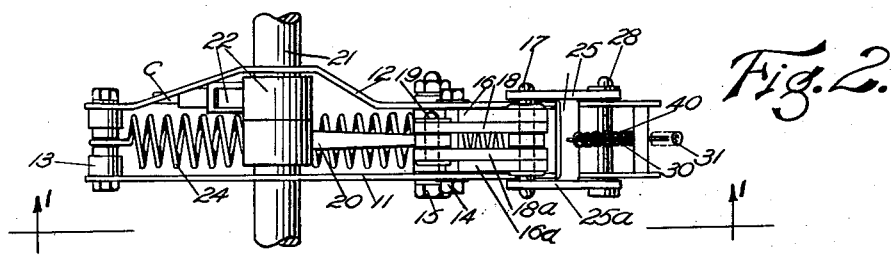
Figure 2 is a plan of the device shown in Figure 1.
Figure 3:
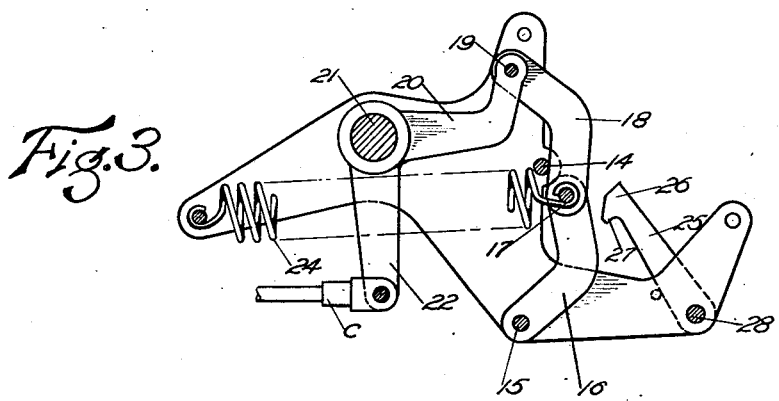
Figure 3 is a side view illustrating the position of the parts when the hand-brake has been automatically applied.

Referring to the system shown in Figures 1 to 3, a device indicated generally at A is operatively interposed between the usual hand-brake lever B of a motor vehicle and the brake rigging C which is to be actuated by the lever B. A brake pedal D is also provided for actuating the foot-brakes of the vehicle by any suitable means, such for example as the hydraulic master cylinder indicated at 10.

The device A comprises a pair of side plates 11 and 12 (see Figure 2) which are maintained side by side in fixed relationship by means of spacing rods 13, 14 and 15. The rod 15 carries pivotally two twin link members 16 and 16a which are of angle shape as shown in Figure 1, and are pivotally attached by means of a pin 17 to similar twin links 18 and 18a. The links 16, 16a, 18, 18a thus form a toggle linkage having the pin 17 as its intermediate pivotal joint. The upper free end of the links 18, 18a are attached pivotally by a pin 19 to the free end of an arm 20 carried upon a shaft 21. The latter is pivoted in the plates 11 and 12 and carries also a brake applying arm 22 to which the brake rigging C is attached by means of a fork member 23. The arms 20 and 22 constitute a bell crank lever, their angular relationship being fixed, although possibly adjustable.

A strong coiled tension spring 24 is disposed between the plates 11 and 12 and is attached at its ends to the spacing member 13 and the pin 17, the tendency of the spring 24 thus being to straighten the toggle linkage 16, 18. This forces the arm 20 in an upward direction and applies the hand-brakes (not shown) by pulling upon the brake rigging C. The spring 24 is, however, held normally in its extended condition by a pair of catch members 25, 25a, each of which is of the shape shown in Figure 1 and has a projection 26 formed with a surface 27 adapted to engage the pin 17. The catch members 25, 25a are both carried upon a pivot 28 and the direction of the surface 27 is substantially at right angles to the plane joining the axes of the pin 17 and pivot 28, thus avoiding any tendency of the catch device to become released of its own accord. The catch members 25, 25a are connected together by a transverse bar 29 to which the free end of the cable 30 of a Bowden wire control device 31 is attached, a transverse bar 32 secured between the plates 11 and 12 serving as the abutment for the sheath of said Bowden control. A coiled compression spring 40 is inserted on the cable 30 between the bar 29 and the bar 30 to urge the catch member 25, 25a into the position shown in the Figure 1. At its other end the sheath of the control 31 engages a bracket 33 having a pivotally mounted lever 34 attached to the other end of the cable 30. Abutment 35 is moved by the pedal D, and when the stroke of the pedal reaches a predetermined value due for example to the clearance of the usual brake shoes becoming excessive, the abutment 35 contacts with the lever 34 when the footbrake is fully applied and the tension thus created in the cable 30 releases the catch members 25, 25a. The spring 24 is thus able to straighten the toggle linkage 16, 18, so applying the hand-brakes without moving the hand-brake lever B. The parts thus assume the position shown in Figure 3, the arm 22 moving to the right and pulling upon the brake rigging C.

In order to permit the actuation of the hand-brakes by means of the lever B in the usual way said lever is connected by a tension link 36 and pin 37 with the upper part of the plates 11 and 12, while the hand lever B is fitted with a ratchet toothed quadrant 38 and a manually releasable detent device 39. The whole of the device A is mounted so as to pivot bodily upon the spindle 21, by which latter it is supported, and it will, therefore, be seen that when the hand lever B is raised while the toggle device is in its locked condition as shown in Figure 1 the force applied through the tension member 36 turns the member A in a counterclockwise direction about the pivot 21. Since the toggle elements 16 and 18 are in locked position they will move with the member A, the element 18 through the pin 19 causing a counterclockwise movement of the bell crank lever 20, 22 about its pivot 21, moving the rod C to apply the brakes.

When the emergency brake applying mechanism has been tripped owing to excessive travel of the pedal D it is easily reset by pulling up the hand lever B. After the applying device has been tripped the elements will be in the relative positions shown in Figure 3. Upward movement of the control member moves the member A in a counterclockwise direction about its pivot 21, thus applying an upward force to the bottom of the links 16, 16a and owing to the resistance to movement offered by the brake rigging C the point 19 is prevented from movement and the toggle linkage 16, 18 is caused to shorten or fold until the pin 17 passes the projections 26 of the catch members 25, 25a at which point said catch members assume their operative position under the influence of a coiled compression spring 40. It will be seen that the spacing member 14 prevents the toggle linkage 16, 18 from assuming a dead center position, thus enabling the device to be reset merely by manipulating the hand lever B.

While one embodiment of the invention has been described in detail, it is not our intention to limit the scope of the invention to that particular embodiment or otherwise than by the terms of the appended claims. The present application is a division of our application Serial No. 161,518, filed August 28, 1937, and issued February 6, 1940 as Patent No. 2,189,192.

We claim:

1. In a mechanism of the class described the combination of a service brake, a control member for said service brake, an emergency brake, a control member for said emergency brake, means connecting the control member for the emergency brake to the said emergency brake, a toggle linkage, the two outer ends of which are operatively connected on the one hand with the control member for the emergency brake and on the other hand with the emergency brake, a catch member acting on the toggle linkage adjacent its intermediate pivotal point, and which is adapted to be released in the event the control member for the service brake overcomes a predetermined position of operating travel, thus causing application of the emergency brake.

2. In a mechanism of the class described the combination of a service brake, a control member for said service brake, an emergency brake, resiliently operated means for applying the emergency brake, linkage connecting the emergency brake to the said applying means, a control member for the emergency brake, a catch normally holding the emergency brake applying means inoperative, means for releasing the catch, said means being operated by over-travel of the control member for the service brake, and means associated with the emergency brake control member for actuating the emergency brake independently of the aforesaid resiliently operated applying means.

3. In a braking system the combination of a service brake, a control member for said service brake, an emergency brake, a resiliently operated mechanism for applying the emergency brake, a lock normally holding said mechanism inoperative, means for applying the emergency brake while retaining the said mechanism in locked position, and means for releasing the lock, said last-named means being operated by over-travel of the control member for the service brake.

4. In a mechanism of the class described the combination of a brake, linkage connected thereto, a member for moving said linkage to apply the brake, resiliently operated means for actuating said member to cause application of the brake, a lock for said resilient means, a control member, and means associated with said control member for moving the said linkage while retaining the resilient means locked.

5. In a mechanism of the class described the combination of a service brake, a control member for said service brake, an emergency brake, linkage connected thereto, a control member for the emergency brake, means operated by said control member for moving the linkage to apply the emergency brake, resiliently operated means independent of said emergency brake control for moving said linkage to apply the emergency brake, a catch normally holding said resiliently operated moving means inoperative, and means for releasing the catch, said last named means being operated by over-travel of the control member for the service brake.

DENIS TABOR BROCK.
GEOFFREY ROBERT GREENBERGH GATES.